United States Patent
Habermann et al.

(10) Patent No.: US 9,075,732 B2
(45) Date of Patent: Jul. 7, 2015

(54) DATA CACHING METHOD

(75) Inventors: Christian Habermann, Boeblingen (DE); Martin Recktenwald, Boeblingen (DE); Hans-Werner Tast, Boeblingen (DE); Ralf Winkelmann, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 581 days.

(21) Appl. No.: 13/159,590

(22) Filed: Jun. 14, 2011

(65) Prior Publication Data
US 2011/0307666 A1 Dec. 15, 2011

(30) Foreign Application Priority Data
Jun. 15, 2010 (EP) .................................. 10165913

(51) Int. Cl.
*G06F 12/00* (2006.01)
*G06F 13/00* (2006.01)
*G06F 13/28* (2006.01)
*G06F 12/08* (2006.01)

(52) U.S. Cl.
CPC .................................. *G06F 12/0897* (2013.01)
USPC .................................. 711/133; 711/E12.007

(58) Field of Classification Search
USPC .............................. 711/133, E12.07, E12.007
See application file for complete search history.

(56) References Cited

U.S. PATENT DOCUMENTS

| | | | | |
|---|---|---|---|---|
| 4,905,141 A * | 2/1990 | Brenza | ......................... | 711/129 |
| 5,023,776 A * | 6/1991 | Gregor | ......................... | 711/122 |
| 5,265,232 A * | 11/1993 | Gannon et al. | ................ | 711/124 |
| 6,629,214 B1 * | 9/2003 | Arimilli et al. | ............... | 711/145 |
| 6,865,645 B1 * | 3/2005 | Shum et al. | .................... | 711/123 |
| 7,577,795 B2 * | 8/2009 | Hutton et al. | ................. | 711/141 |
| 8,131,945 B2 * | 3/2012 | Hutton et al. | ................. | 711/141 |
| 2004/0088487 A1 * | 5/2004 | Barroso et al. | ................ | 711/122 |
| 2007/0174554 A1 * | 7/2007 | Hutton et al. | ................. | 711/133 |
| 2007/0180193 A1 * | 8/2007 | Hutton et al. | ................. | 711/122 |
| 2007/0186045 A1 | 8/2007 | Shannon et al. | | |
| 2009/0157965 A1 | 6/2009 | Shum et al. | | |
| 2009/0216949 A1 * | 8/2009 | Krumm et al. | ................ | 711/122 |
| 2010/0030965 A1 * | 2/2010 | Hutton et al. | ................. | 711/122 |
| 2010/0228922 A1 | 9/2010 | Limaye | | |
| 2010/0262778 A1 | 10/2010 | Cargnoni et al. | | |
| 2012/0215983 A1 * | 8/2012 | Habermann et al. | .......... | 711/122 |

OTHER PUBLICATIONS

Office Action for U.S. Appl. No. 13/459,121 dated Jan. 16, 2014, pp. 1-17.

* cited by examiner

*Primary Examiner* — Shen-Jen Tsai
(74) *Attorney, Agent, or Firm* — Dennis Jung, Esq.; Blanche E. Schiller, Esq.; Heslin Rothenberg Farley & Mesiti P.C.

(57) ABSTRACT

Data caching for use in a computer system including a lower cache memory and a higher cache memory. The higher cache memory receives a fetch request. It is then determined by the higher cache memory the state of the entry to be replaced next. If the state of the entry to be replaced next indicates that the entry is exclusively owned or modified, the state of the entry to be replaced next is changed such that a following cache access is processed at a higher speed compared to an access processed if the state would stay unchanged.

12 Claims, 3 Drawing Sheets

DATA CACHING METHOD

PRIOR FOREIGN APPLICATION

This application claims priority from European patent application number 10165913.4, filed Jun. 15, 2010, which is hereby incorporated herein by reference in its entirety.

BACKGROUND

Typically, a cache subsystem comprises two or more levels within a cache hierarchy, a higher cache memory and a lower cache memory. The cache hierarchy may be such that a plurality of lower memories is assigned to a higher memory.

Within these systems, the cache is organized in cache lines. Cache lines represent a certain segment of an address range and the idea of cache lines is based on the principle of spatial locality. Cache lines are replaced from time-to-time for several reasons.

The higher cache memory is not updated by lower cache memory replacements. A cache line present in the lower cache memory shall also be in the higher cache memory (super-set rule), but an entry marked "lower cache memory-valid" in the higher cache memory may or may not be in the lower cache memory. Actually, the higher cache memory does not know which lines were already replaced within the lower cache memory.

In order to solve the problem that lower cache memory and higher cache memory get inconsistent, cache coherency protocols were developed in the past.

Within such a protocol the higher cache memory sends so called cross interrogate commands (XI) to the lower cache memory to control the state of the cache lines present in the lower cache memory.

XI commands may comprise 'invalidate' (forcing the state to invalid "I-State"), or 'demote to shared' ("S-State").

BRIEF SUMMARY

According to one embodiment of the present invention, a data caching method for use in a computer system comprising a lower cache memory and a higher cache memory is provided. Within the method the higher cache memory is receiving a fetch request. It is then determined by the higher cache memory the state of the entry to be replaced next. If the state of the entry to be replaced next indicates that the entry is exclusively owned or modified, changing the state of the entry to be replaced next such that a following cache access will be processed at a higher speed compared to an access processed if the state would stay unchanged.

According to another embodiment of the present invention, a cache memory hierarchy comprising a lower cache memory and a higher cache memory is provided. The cache memory hierarchy further comprises means for receiving by the higher cache memory a fetch request, means for determining by the higher cache memory the state of the entry to be replaced next, and means for changing the state of the entry to be replaced next such that a following cache access will be processed at higher speed compared to an access processed if the state would stay unchanged, if the state of the entry to be replaced next indicates that the entry is exclusively owned or modified.

BRIEF DESCRIPTION OF THE SEVERAL VIEWS OF THE DRAWINGS

One or more embodiments of the invention are illustrated in the accompanied figures. These embodiments are merely exemplary, i.e., they are not intended to limit the content and scope of the appended claims.

DETAILED DESCRIPTION

Typically, a replacement scheme is defined. Replacement schemes may be based on First In First Out (FIFO), i.e. the oldest entry will be replaced, Least Recently Used (LRU), i.e. the entry which has not been accessed for the longest time, Least Frequently Used (LFU), i.e. the entry which has been used most seldom, a Random entry is used, etc.

The replacement scheme of the higher cache memory defines the 'higher cache memory-landing spot' of the new to be installed line prior to delivering it to the lower cache memory. To process along a certain replacement scheme, the higher cache memory stores the entry to be replaced next.

Now, when a new cache-line shall be placed in the higher cache memory it shall also be placed in the lower cache memory as well, i.e. it shall be stored through.

However, in order to be able to do so, the cache line to be replaced next is to be in a state that allows for storing.

If the entry to be replaced next indicates that the entry is still owned by a lower cache memory or the entry to be replaced next indicates that the entry is still exclusively owned or indicates that the entry is in a modified state, the entry cannot be used in a direct manner.

This leads to a situation where, by means of time consuming actions, the concerned entry needs to be preprocessed before it can be overwritten by the replacement.

In particular, in a situation where data is received, e.g. from a still higher cache memory or the like, faster than the respective entry to be replaced can be freed, this leads to a slow down of the processing.

With reference to the figures a further detailed explanation will now be given.

In the following it is assumed that a cache-line A is referenced by an entry to be replaced next while a cache-line B is assumed to replace the cache line, i.e. cache-line B is intended to be stored at the location which was occupied by cache-line A.

Figure 1:
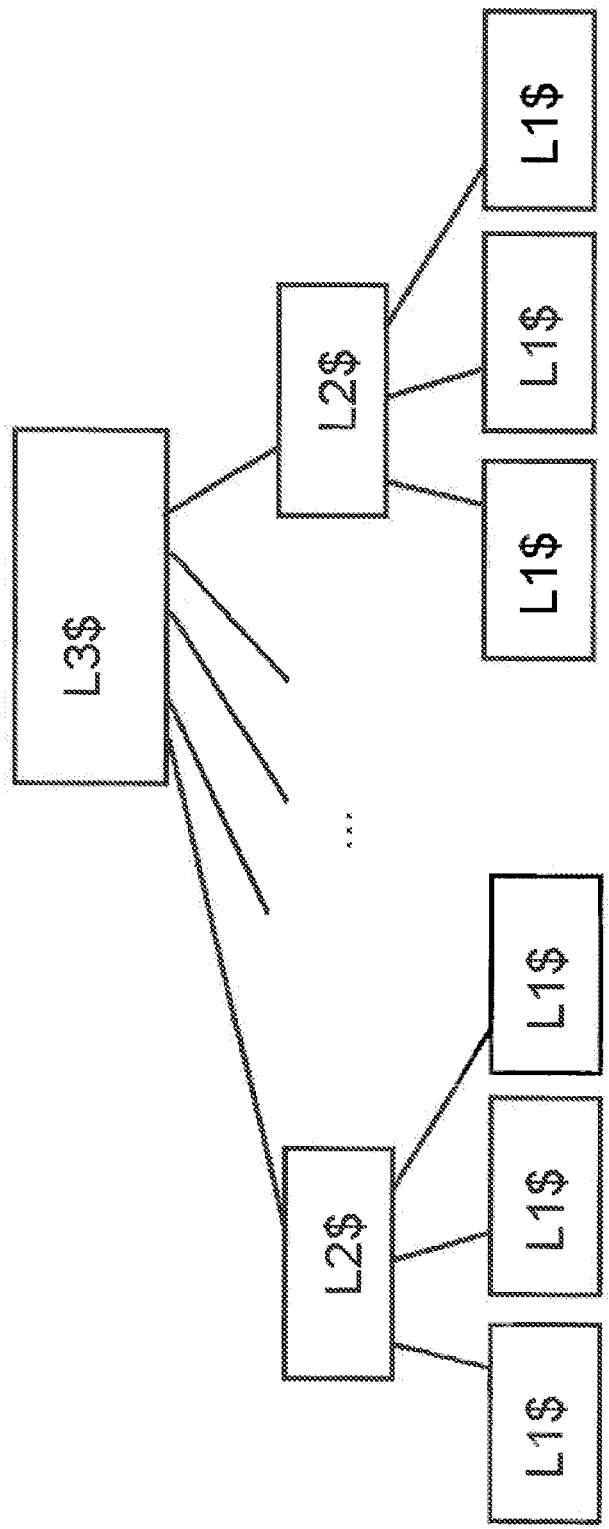
FIG. 1 shows one example of a cache memory hierarchy, in accordance with an aspect of the present invention.

Such a replacement happens in case of a cache-miss in the higher cache, e.g. in the example cache hierarchy shown in FIG. 1, the lower cache memory may be embodied in a Level 1 cache memory (L1$) while the higher cache memory may be embodied in a Level 2 cache memory (L2$). The cache hierarchy may—as shown in FIG. 1—even include further levels; exemplary displayed is a Level 3 cache memory while not being limited to 3 Levels.

Although in the following one or more aspects of the invention will be detailed with reference to a Level 1 and a Level 2 cache memory, one or more aspects of the invention are not limited thereto, but are intended to encompass any memory hierarchy; i.e., in the following a higher memory could as well be embodied by the Level 3 memory while the lower memory could be embodied by the L2 memory.

In the following, it will first be shown what will happen when one or more aspects of the invention are not utilized. Thereafter, it will be shown how one or more aspects of the invention improves performance.

First, it is assumed that a cache miss in the higher cache memory (L2$) is detected, and such a cache miss will provoke cross interrogates to be sent out to any associated lower cache memory (L1$).

Before cache-line B can be stored in the lower memory cache (L1$), the entry to be replaced next pointing to cache-line A needs to be set to a state allowing it to be overwritten. If the entry indicates that it is not in a state allowing it to be overwritten, then the higher cache memory has to send cross interrogate commands (XI) towards the associated lower cache memory (L1$).

If the cache-line A was not invalid and marked as owned exclusively or modified by the lower cache memory (L1$), the higher cache memory has to await the response returned from the lower cache memory (L1$). This may turn out to represent a bottleneck, since such a processing and awaiting of a response might necessitate a big portion of time.

It can happen that this process takes longer than a delay caused by an access of a higher level, e.g. a Level 3 cache, to fetch cache-line-B. Then, cache-line B has to stall within the higher cache memory (L2$) before it can be delivered to the lower cache memory (L1$) which prolongs the response time, and thereby, negatively affects the performance of the system.

According to an aspect of the invention a check is made when receiving an access to the higher cache memory (L2$) that the higher cache memory determines the state of the entry to be replaced next (RE).

The access may be a fetch request. The cache hierarchy comprises for this purpose means for receiving by the higher cache memory (L2) an access such as a fetch request. Furthermore, the cache hierarchy comprises means for determining by the higher cache memory (L2) the state of the entry to be replaced next (RE).

The entry to be replaced next may be defined by a replacement scheme. Replacement schemes may be based on First In First Out (FIFO), i.e. the oldest entry will be replaced, Least Recently Used (LRU), i.e. the entry which has been not accessed for the longest time, Least Frequently Used (LFU), i.e. the entry which has been used most seldom, a Random entry is used, etc.

If the state of the entry (RE) to be replaced next indicates that the entry is not owned at all by a Lower cache memory or is exclusively owned or modified, the state of the entry to be replaced next is changed, such that a following cache access will be instigated so that it will be processed at a higher speed compared to an access processed if the state would stay unchanged.

The cache hierarchy comprises for this purpose means for changing the state of the entry to be replaced next (RE) such that a following access will be processed at higher speed compared to an access processed if the state would stay unchanged, if the state of the entry to be replaced next indicates that the entry is not owned at all by a Lower cache memory or is exclusively owned or modified.

In doing so, it is ensured that a later received access, e.g. due to another L2$ cache miss will be processed at higher speed. This is enabled by the fact that the entry has already been set to a state which allows for faster delivery.

A state which allows for faster delivery is e.g. invalid. In this case, no cross interrogate commands are necessary.

Another state which allows for faster delivery is e.g. shared. In this case the respective cross interrogate commands may be processed at a higher speed compared to invalidate commands sent to a modified or exclusive marked entry.

This is due to the fact that it is not necessary to await the response of the lower cache memory (L1$). Since the access times of the higher memories are typically longer than those in the lower memories, the processing time of the cross interrogate command is typically not experienced by the higher memory, i.e. they are not seen by the higher memory since they do not lead to a sensible delay.

In comparison to the situation before one or more aspects of the invention one sees that now the entry to be replaced next (RE) is pre-processed.

If the determination of the state of the entry to be replaced next (RE) takes only into account whether the state is owned exclusively or modified and if the change in state pertains to setting the state to shared, this allows for the existence of shared lines within the lower cache memory (L1$). This might enhance the cache performance in case the size of the higher memory (L2$) is not much larger than the lower cache memory (L1$).

Turning now to an implementation embodying an aspect of the invention, it is assumed in the following a 12-way set-associative higher cache memory (L2$) shared by 3 lower cache memories (L1$) (FIG. 1).

Figure 2:
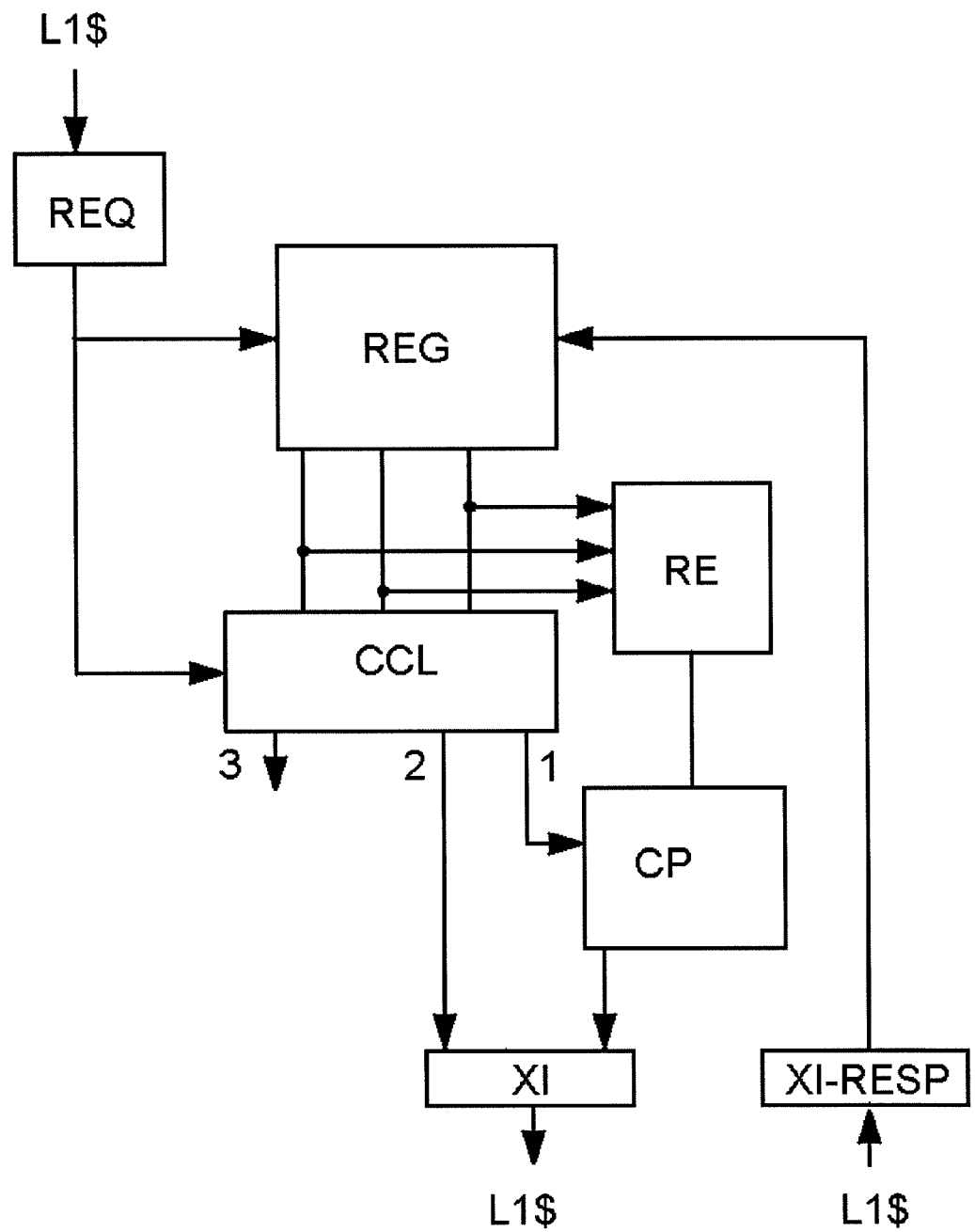
FIG. 2 shows one example implementation, in accordance with an aspect of the present invention.
Figure 3:
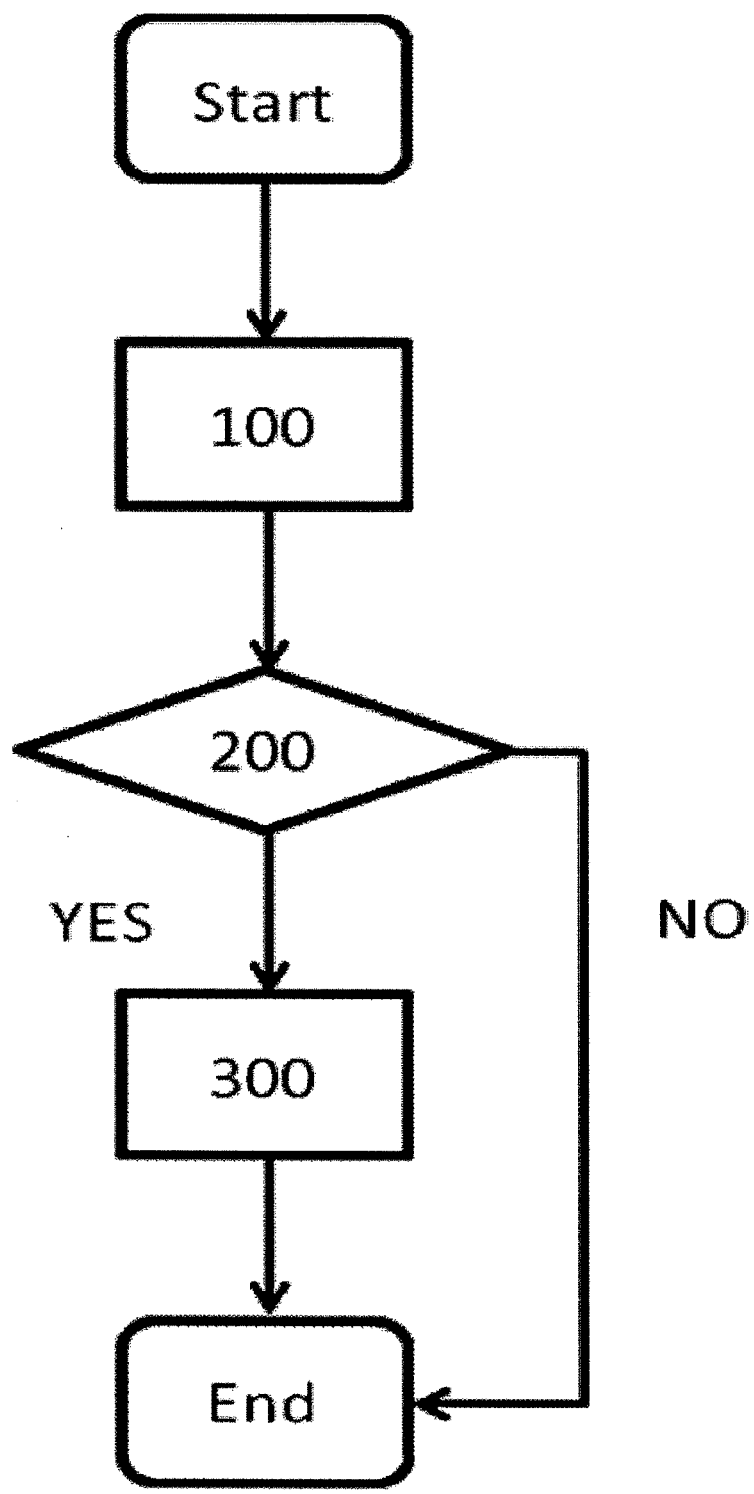
FIG. 3 shows one example of a flow chart, in accordance with an aspect of the present invention.

In the following, FIG. 2 will be further detailed in connection with FIG. 1. When the higher cache memory (L2$) receives a fetch request (REQ) from one of the lower cache memories (L1$), the higher cache memory (L2$) searches its directory (REG) to determine (CCL) whether the request may be classified in one of the following classes:

1. if the request can be serviced from the higher cache memory (L2$), i.e. a cache hit (L2$-hit),
2. if the request needs to send Cross Interrogate (XI) to a lower cache memory (L1$) attached to this higher cache memory (L2$)
3. or if the higher cache memory (L2$) has to forward the fetch request, e.g. to a next level cache such as a shown Level 3 cache (L3$), i.e. a cache miss (L2$-miss)

The higher cache memory directory (REG) uses as input a congruence class determined from data included in the fetch request, while the determination uses tag(s) provided by the data included in the fetch request.

The higher cache memory (L2$) reads, for instance, all its 12 directory-entries (REG) of the congruence class and compares (CCL) the directory-entries with the request from the lower cache memory (L1$) and detects into which one of the cases identified above the request falls.

Case 2 is also an L2$-hit, but needs to send an XI to a lower cache memory (L1$) before the higher cache memory (L2$) can send the requested data to the lower cache memory (L1$). After the XI was sent, the access to the higher cache memory (L2$) is repeated and shall result in case 1.

When reading the 12 higher cache memory-directory entries, the RE entry is copied separately to be available for case 3 (L2$-miss). Without a proactive cross interrogate command, the RE information is not used in any other case but case 3.

If the RE entry indicates that the RE line is valid in any one of the three lower cache memories (L1$), i.e. it is in case 1, a proactive cross interrogate command is instigated for the L2$-RE entry by means of determining the state of the entry to be replaced next (CP). The means for determining (CP) then trigger a proactive cross interrogate command (XI). The proactive cross interrogate command is sent to the lower cache memory (L1$) on the same interface as the cross interrogate commands (XI) for case 2 are sent. The L2$-directory (REG) is updated when the proactive cross interrogate command was sent, or, when the XI response (XI-RESP) was received from the lower cache memory (L1$), depending on the cross interrogate command. The next access to the same higher cache memory (L2$) congruence class will now find the RE entry invalid.

In case of an L2$-hit (case 1) on the RE entry for the next access to the same congruence class, the proactive cross interrogate command may be suppressed by the means for determining since the proactive cross interrogate command would invalidate the recently fetched line from the lower cache memory (L1$). Even though this is functionally correct, it may be undesired from a performance perspective.

If the RE entry indicates that the RE line is owned exclusive or modified by any lower cache memory (L1$), a proactive cross interrogate command is generated for the L2$-RE entry. The proactive cross interrogate command is sent to the lower cache memory (L1$) on the same interface, as the cross interrogate commands (XI) for case 2 are sent. The L2$-directory (REG) is updated when the proactive cross interrogate command response (XI-RESP) was received from the lower cache memory (L1$), depending on the cross interrogate command. The next access to the same L2$ congruence class will now find the RE entry in shared state.

In case of an L2$-hit (case 1) on the RE entry for the next access to the same congruence class, the proactive cross interrogate command may be suppressed by the means for determining since the proactive cross interrogate command would invalidate the recently fetched line from the lower cache memory (L1$). Even though this is functionally correct, it may be undesired from a performance perspective.

According to one embodiment of the present invention, a data caching method for use in a computer system comprising a lower cache memory and a higher cache memory is provided. Within the method the higher cache memory is receiving a fetch request. It is then determined by the higher cache memory the state of the entry to be replaced next. If the state of the entry to be replaced next indicates that the entry is exclusively owned or modified, changing the state of the entry to be replaced next such that a following cache access will be processed at a higher speed compared to an access processed if the state would stay unchanged.

In a further embodiment the fetch request and the entry to be replaced pertain to a certain congruence class.

In a still further embodiment changing the state of entry to be replaced next comprises setting to a state indicating that the entry is valid but may be set to invalid at any time.

In a yet another embodiment changing the state comprises a cross interrogate command send to the lower cache memory.

In a still further embodiment changing the state comprises demoting the entry to shared.

According to another embodiment of the present invention, a cache memory hierarchy comprising a lower cache memory and a higher cache memory is provided. The cache memory hierarchy further comprises means for receiving by the higher cache memory a fetch request, means for determining by the higher cache memory the state of the entry to be replaced next, and means for changing the state of the entry to be replaced next such that a following cache access will be processed at higher speed compared to an access processed if the state would stay unchanged, if the state of the entry to be replaced next indicates that the entry is exclusively owned or modified.

In a further embodiment the fetch request and the entry to be replaced pertain to a certain congruence class.

In a still further embodiment the means for changing are adapted to set to the state of entry to be replaced next to a state indicating that the entry is valid but may be set to invalid at any time.

In a yet another embodiment the means for changing are adapted to send a cross interrogate command to the lower cache memory.

In a still further embodiment the means for changing are adapted to demote the entry to shared.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A computer system comprising:
    a cache memory hierarchy comprising at least one lower cache memory coupled to a higher cache memory, wherein the computer system is configured to perform a method, said method comprising:
        receiving by the higher cache memory a fetch request to provide a first line of data;
        based on receiving the fetch request, determining by the higher cache memory a state of an entry to be replaced next, the entry being for a second line of data different from the requested first line of data; and
        based on the state of the entry to be replaced next indicating that the entry is exclusively owned or modified, initiating, by the higher cache memory, changing of the state of the entry to be replaced next, wherein based on a subsequent request received by the higher cache memory to provide a third line of data, which is to replace the second line of data in the higher cache memory, an access to replace the second line of data with the third line of data in the higher cache memory will be processed at higher speed compared to an access to replace the second line of data with the third line of data in the higher cache memory responsive to the state of the entry for the second line of data staying unchanged.

2. The computer system of claim 1, wherein the first line of data and the entry to be replaced pertain to a same congruence class.

3. The computer system of claim 1, wherein changing the state of the entry to be replaced next comprises setting to a state indicating that the entry is valid but may be set to invalid at any time.

4. The computer system of claim 1, wherein a lower cache memory of the at least one lower cache memory maintains a copy of the second line of data, and wherein changing the state comprises the higher cache memory sending a cross interrogate command to the lower cache memory to indicate the change to the state.

5. The computer system of claim 1, wherein changing the state comprises demoting the entry to shared.

6. A computer program product for caching data in a computer system comprising a buffer memory comprising at least one lower cache memory coupled to a higher cache memory, said computer program product comprising:
    a computer readable storage medium readable by a processing circuit and storing instructions for execution by the processing circuit for performing a method comprising:
        receiving by the higher cache memory a fetch request to provide a first line of data;
        based on receiving the fetch request, determining by the higher cache memory a state of an entry to be replaced next, the entry being for a second line of data different from the requested first line of data; and
        based on the state of the entry to be replaced next indicating that the entry is exclusively owned or modified, initiating, by the higher cache memory, changing of the state of the entry to be replaced next, wherein based on a subsequent request received by the higher cache memory to provide a third line of data, which is to replace the second line of data in the higher cache memory, an access to replace the second line of data with the third line of data in the higher cache memory will be processed at higher speed compared to an access to replace the second line of data with the third line of data in the higher cache memory responsive to the state of the entry for the second line of data staying unchanged.

7. The computer program product of claim 6, wherein the first line of data and the entry to be replaced pertain to a same congruence class.

8. The computer program product of claim 6, wherein changing the state of the entry to be replaced next comprises setting to a state indicating that the entry is valid but may be set to invalid at any time.

9. The computer program product of claim 6, wherein a lower cache memory of the at least one lower cache memory maintains a copy of the second line of data, and wherein changing the state comprises the higher cache memory sending a cross interrogate command sent to the lower cache memory to indicate the change to the state.

10. The computer program product of claim 6, wherein changing the state comprises demoting the entry to shared.

11. The computer system of claim 1, wherein changing the state of the entry comprises the higher cache memory sending a command to a lower cache memory, and the lower cache memory changing a state of a maintained copy of the second line of data from valid to another state.

12. The computer program product of claim 6, wherein changing the state of the entry comprises the higher cache memory sending a command to a lower cache memory, and the lower cache memory changing a state of a maintained copy of the second line of data from valid to another state.

\* \* \* \* \*